United States Patent
Graeser et al.

(10) Patent No.: US 9,746,034 B2
(45) Date of Patent: Aug. 29, 2017

(54) DISTRIBUTED LOAD BEARING WITH AN INNER FLEX RING

(71) Applicant: DEERE & COMPANY, Moline, IL (US)

(72) Inventors: Matthew J Graeser, Aiken, SC (US); Steven A Reich, Washoe Valley, NV (US); Neil S Erickson, Denver, IA (US); Dale J Swehla, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 15 days.

(21) Appl. No.: 14/925,261

(22) Filed: Oct. 28, 2015

(65) Prior Publication Data

US 2017/0122375 A1     May 4, 2017

(51) Int. Cl.
    *F16H 53/06*      (2006.01)
    *F16C 41/02*      (2006.01)
    *F16C 19/26*      (2006.01)

(52) U.S. Cl.
    CPC .............. *F16C 41/02* (2013.01); *F16C 19/26* (2013.01); *F16H 53/06* (2013.01); *F16C 2360/22* (2013.01)

(58) Field of Classification Search
    CPC .......... F16C 17/02; F16C 19/26; F16C 25/08; F16C 33/58; F16C 33/581; F16C 41/02; F16C 2229/00; F16C 2360/18; F16C 2360/22; F16H 53/06; F16H 53/08
See application file for complete search history.

(56) References Cited

U.S. PATENT DOCUMENTS

| | | | | |
|---|---|---|---|---|
| 1,136,077 A | * | 4/1915 | Wiking | .................. F16C 19/54 |
| | | | | 384/459 |
| 3,003,836 A | * | 10/1961 | Hill | ....................... B21B 31/074 |
| | | | | 384/455 |
| 4,375,247 A | | 3/1983 | McNeely | |
| 2008/0163839 A1 | | 7/2008 | Watanabe et al. | |
| 2011/0194794 A1 | * | 8/2011 | Joki | ......................... F16C 9/02 |
| | | | | 384/457 |
| 2013/0167957 A1 | | 7/2013 | Rajput et al. | |

FOREIGN PATENT DOCUMENTS

DE      102010036248 A1     3/2012

OTHER PUBLICATIONS

European Search Report in foreign counterpart application No. 16193774.3 dated Mar. 23, 2017 (6 pages).

* cited by examiner

*Primary Examiner* — Adam D Rogers

(57) ABSTRACT

A distributed load bearing including a roller, an inner flex ring, a pin and a load distribution spring. The inner flex ring is positioned radially inwards of the roller, and the pin is positioned radially inwards of the inner flex ring, and the load distribution spring is positioned in a cavity defined by the pin and the inner flex ring. The load distribution spring is preloaded, so as to apply a force to the pin and so as to apply a plurality of radially outward forces to the inner flex ring.

18 Claims, 7 Drawing Sheets

DISTRIBUTED LOAD BEARING WITH AN INNER FLEX RING

FIELD OF THE DISCLOSURE

The present disclosure relates to a distributed load bearing.

BACKGROUND OF THE DISCLOSURE

Diesel engines use a much leaner air-to-fuel ratio than gasoline engines. The larger amount of air in the intake gas promotes more complete fuel combustion and better fuel efficiency, and thus lower emissions of hydrocarbons and carbon monoxide than gasoline engines. However, with the higher pressures and temperatures in the diesel engine, nitrogen oxides emissions, which include nitrogen oxide (NO) and nitrogen dioxide ($NO_2$), known collectively as $NO_x$, tend to be higher because the high temperatures cause the oxygen and nitrogen in the intake air to combine.

To comply with increasingly stringent government mandates regarding $NO_x$ emissions, engine manufacturers have developed several $NO_x$ reduction approaches. One such approach is exhaust gas recirculation (EGR), in which a percentage of the exhaust gas is drawn or forced back into the intake and mixed with the fresh intake gas and fuel that enters the combustion chamber. Another approach is selective catalytic reduction (SCR). The SCR process reduces $NO_x$ to diatomic nitrogen ($N_2$) and water ($H_2O$) using a catalyst and anhydrous ammonia ($NH_3$) or aqueous $NH_3$, or a precursor that is convertible to $NH_3$, such as urea.

In addition to $NO_x$ emissions, diesel engines also produce particulate matter (PM), or soot, which is produced in comparatively larger amounts than that of gasoline engines. PM is a complex emission that includes elemental carbon, heavy hydrocarbons derived from the fuel, lubricating oil, and hydrated sulfuric acid derived from the fuel sulfur. One approach for reducing or removing PM in diesel exhaust is a diesel particle filter (DPF). The DPF is designed to collect PM while simultaneously allowing exhaust gases to pass therethrough.

These example approaches as well as others may result in, or require, cylinder pressures that are relatively high, as compared to cylinder pressures in systems not using such approaches. These higher cylinder pressures create higher forces, and these higher forces are then applied to the intake and exhaust valves. Further, these forces are then translated to other components in the valvetrain, including the rockers, pushrods, and followers, among other things. Such forces may result in failures to these and other components in the engine.

SUMMARY OF THE DISCLOSURE

Disclosed is a distributed load bearing that includes a roller, an inner flex ring, a pin, and a load distribution spring. The inner flex ring is positioned radially inwards of the roller, the pin is positioned radially inwards of the inner flex ring, and the load distribution spring is positioned in a cavity defined by the pin and the inner flex ring. The load distribution spring is preloaded, so as to apply a force to the pin and a plurality of radially outward forces to the inner flex ring.

The distributed load bearing may provide for a more even distribution of loads, have a higher load capacity, and have an extended life. By using the load distribution spring, the capacity of the rollers is greatly improved, such that they can now be utilized in highly loaded engine applications.

Incorporating rollers (e.g., needle rollers) and a load distribution spring may provide several advantages over journal bearings. Bearings with rollers may have a substantially lower running friction than journal bearings, and they may enable the use of lighter viscosity oils. Further, they may require only a relatively low volume of oil, as the predominate motion at the contact points is rolling motion, instead of sliding motion. The low volume of oil may result in reduced oil pump power losses and reduced windage losses, based on less oil flowing through the crankcase and impeding the rotation of the crankshaft. By incorporating rollers, a given engine's efficiency may be improved, based on the reduced friction and the lower oil volume requirements.

Additionally, bearings with rollers (e.g., needle rollers) and a load distribution spring may be a lower cost alternative than journal bearings, given that many of them require higher cost alloys or diamond like coatings (DLC). By utilizing bearings with rollers, manufacturers may leverage high volume production methods and materials developed by the leading bearing manufacturing, thereby reducing costs.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
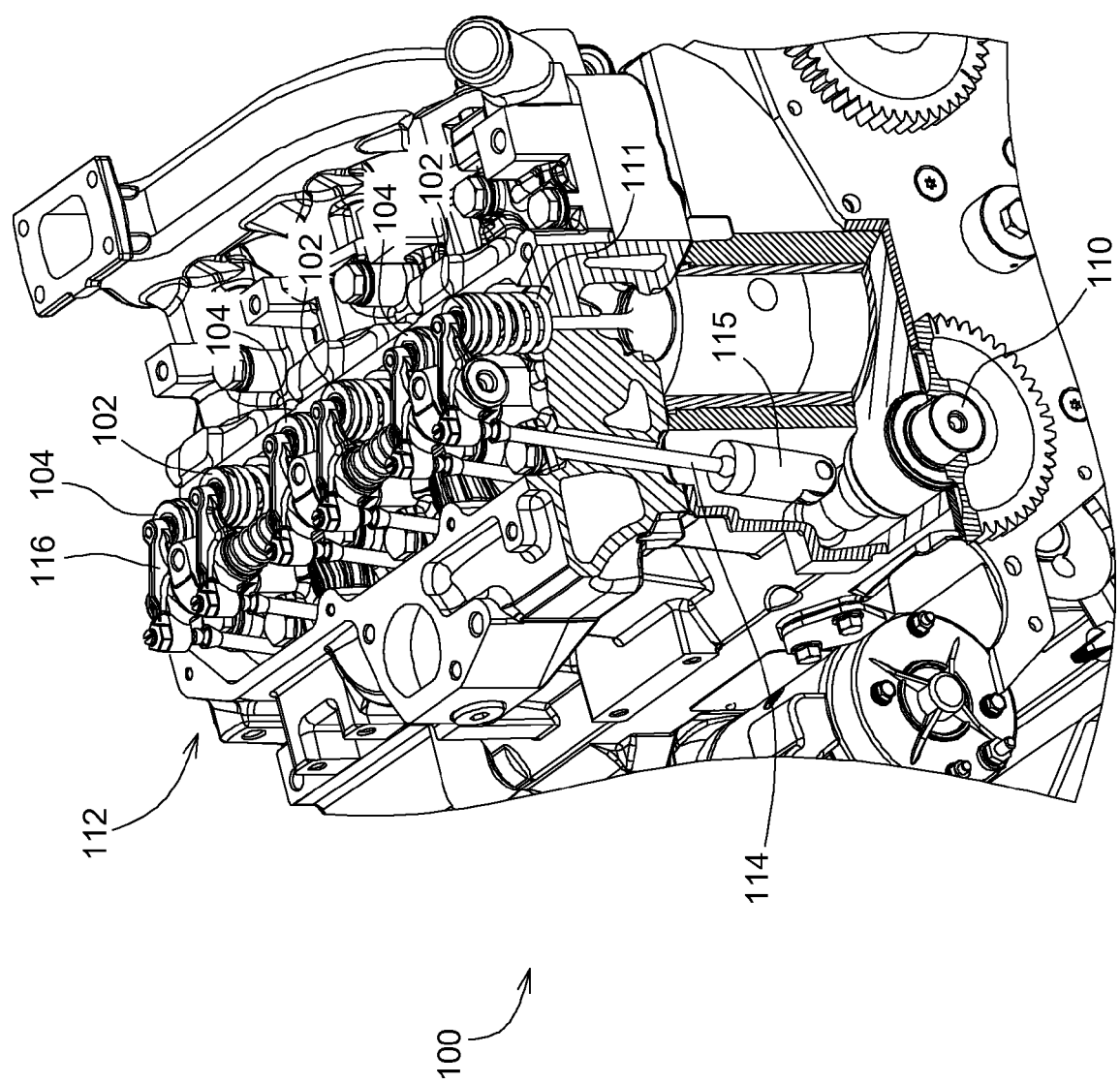
FIG. 1 is a perspective view of an engine and a valvetrain.
Figure 2:
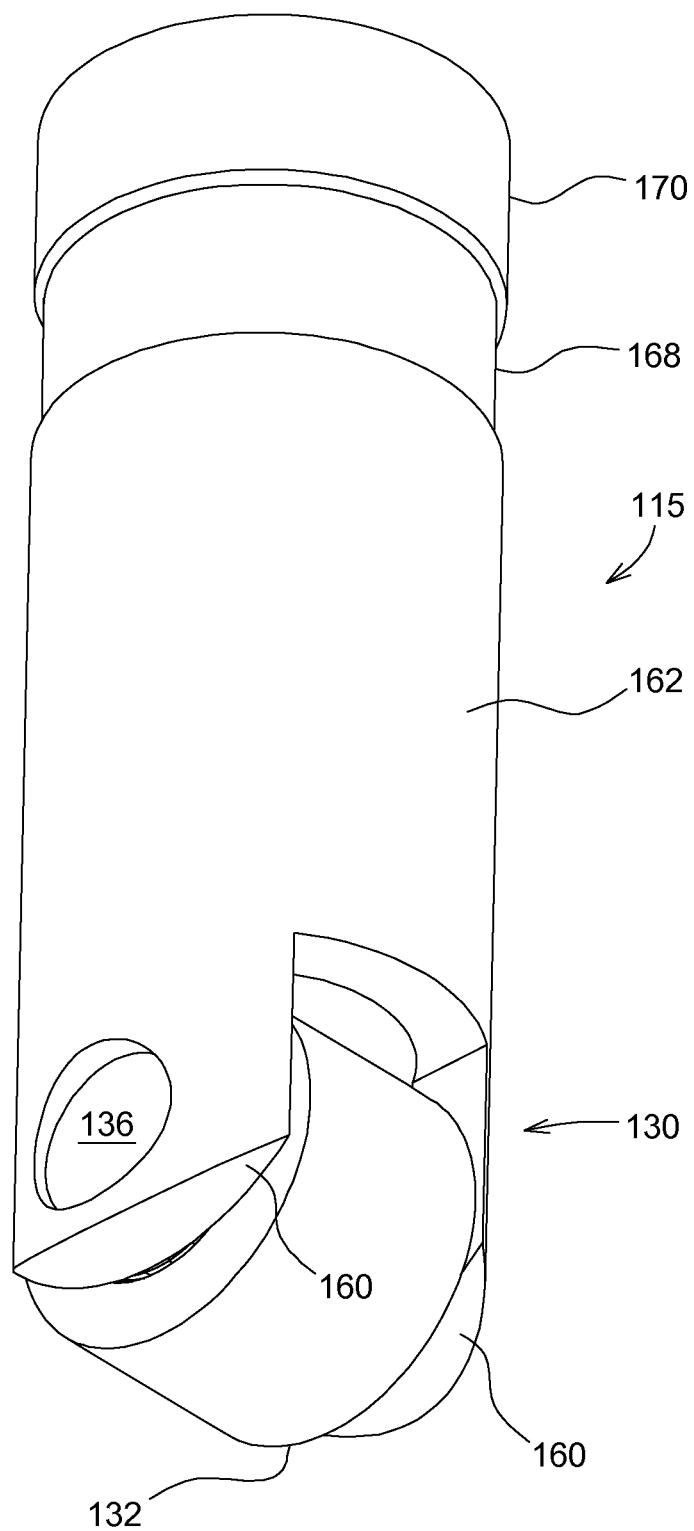
FIG. 2 is an enlarged perspective view of an example of a follower.

Referring to FIG. 1, there is shown a perspective view of an engine 100 that could be used for providing power to a variety of machines, including on-highway trucks, automobiles, marine vessels, stationary generators, construction machinery, agricultural machinery, and recreational vehicles. The engine 100 may be an internal combustion engine, such as a gasoline engine or a diesel engine, and it may be of any size, have any number cylinders, and be of any configuration (e.g., "V," inline, and radial). The engine 100 is shown as having a single intake valve 102 and a single exhaust valve 104 with respect to each cylinder, but other embodiments may have two intake valves and two exhaust valves, for example. In such embodiments, there may be a crosshead used for contacting both the intake valves and exhaust valves and opening them simultaneously.

The engine 100 must receive the intake gas and dispel the exhaust gas at precise internals using a valvetrain 112.

During an intake stroke of a piston, its respective intake valve 102 is generally open, and during an exhaust stroke, the respective exhaust valve 104 is generally open. During the other strokes, both the intake valve 102 and the exhaust valve 104 are generally closed. The valvetrain 112 may include a camshaft 110 that turns at one half of the speed of the crankshaft, so that the intake valves 102 and the exhaust valves 104 are closed once during the two revolutions of the crankshaft.

Springs 111 may be positioned around the intake valves 102 and exhaust valves 104, so as to keep them closed until respectively opened by the camshaft 110. The springs 111 may be cylindrical springs, and in some cases, there may be two springs used for each of the valves 102, 104, so as to minimize spring vibration and valve flutter. The springs 111 may be designed based, in part, on the mass of the other components in the valvetrain 112. For example, heavier components may require stiffer, stronger springs 111.

The valvetrain 112 includes rockers 116 for transmitting motion from the camshaft 110 to the intake valves 102 and the exhaust valves 104. Each rocker 116 oscillates, as the forces are received and applied to the first and second ends thereof. The rocker 116 may be made of, for example, 1010, 1018, or 1020 steel that is stamped and then formed, and it may further go through a nitriding or carbonizing process for increasing the strength thereof.

Push rods 114 may be used for providing motion of the camshaft 110 to the rockers 116. Each push rod 114 may be a hollow steel pipe with solid steel ends. The lower end of the push rod 114 may be formed into a half-round head to match a spherical seat 170 in a follower 115, while the upper end, in contrast, may have a spherical socket to match an adjusting screw of the rocker 116. When the push rods 114 move up, the mating rocker 116 is moved down, so as to contact a valve stem tip of an intake valve 102 or exhaust valve 104.

The follower 115 works off of lobes of the camshaft 110, so as to drive the push rods 114 that drive the valves 102, 104. It includes a distributed load bearing 130 and a roller 132 on its driven end. The roller 132 rolls along the lobe of the camshaft 110, so as to reduce friction and wear. The follower 115 may include a shaft 162 and a pair of retaining arms 160 extending therefrom, one of the arms 160 being on one side of the bearing 130, and the other arm 160 being on the other side of the bearing 130. Each arm 160 includes an aperture, each of which receives an end of a pin 136. The pin 136 may be press fit into the arms 160, so as to be rotationally fixed relative thereto.

The follower 115 may include the spherical seat 170 in contact with the push rod 114. Still further, the follower 115 may include a coupler 168 positioned between the pin 136 and the shaft 162. The coupler 168 may be positioned partially inside of the shaft 162, and the spherical seat 170 may be positioned partially outside of and around the shaft 162.

Though not illustrated, an exhaust system of the engine 100 may include an aftertreatment system for reducing, among other things, particulate matter and $NO_x$. It may include an oxidation catalyst, a diesel particulate filter for reducing the particulate matter, and a SCR catalyst for removing the $NO_x$. A reductant may be injected into the exhaust downstream of the diesel particulate, but upstream of the SCR catalyst. Some examples of the engine 100 may also include an EGR system that reroutes a portion of the exhaust gas (EGR gas) and mixes it with a fresh intake gas, so as to form a mixed intake gas that is combusted in the engine 100. The inclusion of the EGR gas lowers the combustion temperatures and, thus, reduces $NO_x$ levels exiting the combustion chamber.

Referring to FIGS. 2-6, an enlarged view of the follower 115 and the bearing 130 is shown. The bearing 130 includes a roller 132, an inner flex ring 134, an outer ring 135, the pin 136, and a load distribution spring 138. Even though the bearing 130 is shown herein as part of a follower 115, it may be used in various other kinds of applications, including with camshafts, connecting rods, crankshafts, rockers, and transmission components, just to name a few examples. The distribution spring 138 may be rotationally fixed relative to the arms 160, as a result of the pin 136 also being rotationally fixed relative thereto.

The flex ring 134 is positioned radially inwards of the roller 132, the pin 136 is positioned radially inwards of the flex ring 134, and the distribution spring 138 is positioned in a cavity 139 (see FIG. 6) defined by the pin 136 and the flex ring 134. The distribution spring 138 may be made of, for example, 1078 or 1080 steel, and the flex ring 134 may be made of, for example, 1008 or 1010 steel that is heat treated and properly conditioned to accept contact loads. The cavity 139 may be positioned lower than a horizontal centerline defined by the flex ring 134. By placing the cavity 139 lower, the pin 136 is thicker and stronger than it would be if the cavity 139 was placed higher, for example up to its horizontal centerline or above the horizontal centerline.

The distribution spring 138 is preloaded, so as to apply a force 171 to the pin 136 and so as to apply a plurality of radially outward forces to the flex ring 134. The pin 136 and the distribution spring 138 may be angularly and axially fixed relative to the shaft 162 and the pair of arms 160. The size and flexibility of the distribution spring 138 may be designed using finite element analysis, and may be based on a maximum load and the overall operating loads, for example.

The bearing 130 may include a plurality of rollers 140 positioned radially inwards of the roller 132, but radially outwards of the flex ring 134. As shown, the rollers 140 may be needle rollers, but they may also be spherically shaped, to name just one other example. The outer ring 135 may be positioned radially inwards of the roller 132, but radially outwards of the rollers 140. There may be a clearance between the respective rollers 140, so as to minimize heat and friction issues, for example.

Figure 6:
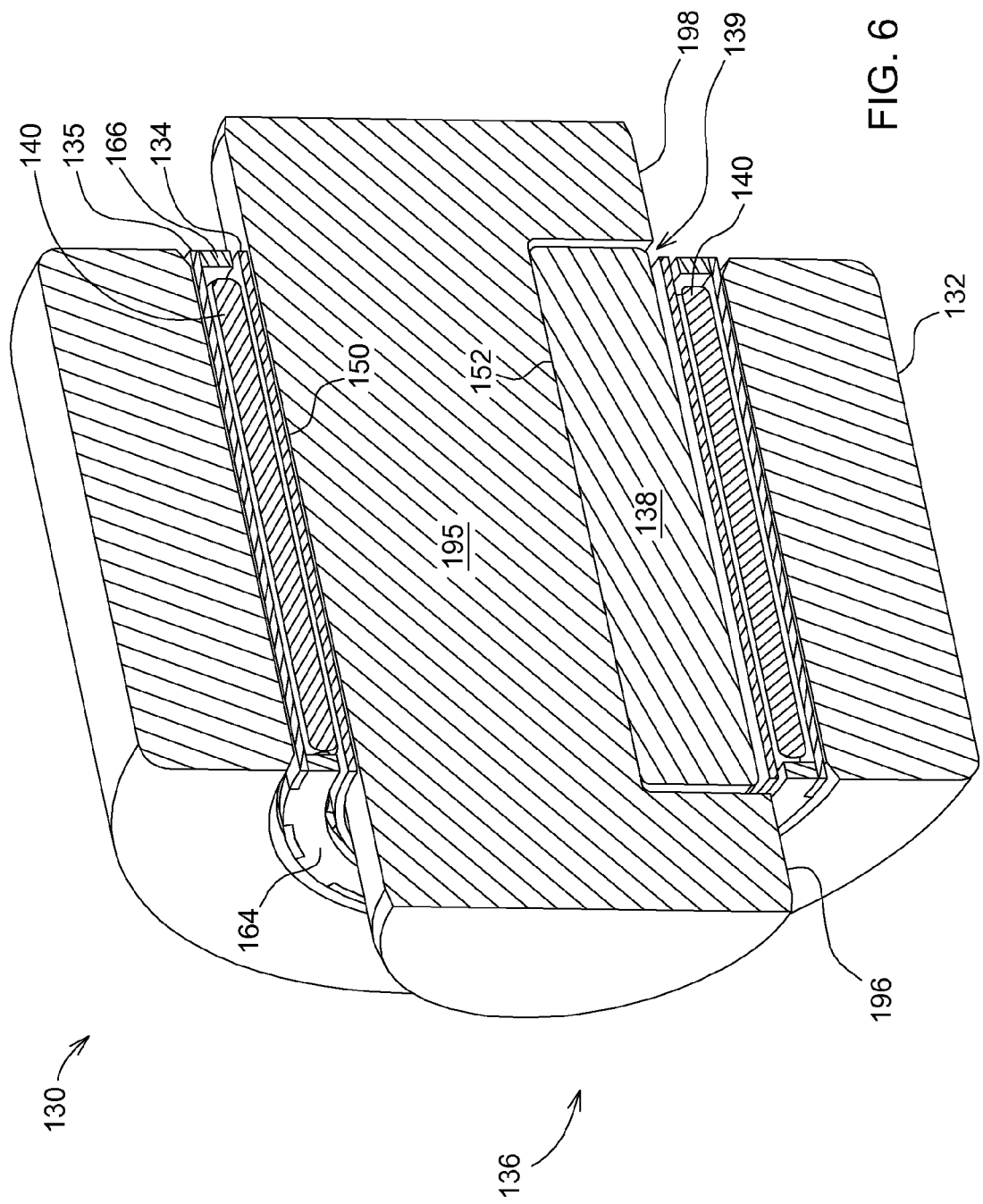
FIG. 6 is a sectional view of the distributed load bearing taken along lines 6-6 of FIG. 3.

As shown in FIG. 6, the rollers 140 may be axially positioned by a first cage 164 and a second cage 166. In the illustrated embodiment, the cages 164, 166 are coupled to and engaged with the outer ring 135. The outer ring 135 may have an inner diameter that is large enough to fit all of the components positioned radially inwards thereof, even when the flex ring 134 is deflected (i.e., noncircular). The outer ring 135 may be made of heat treated 1008 or 1010, for example. Some embodiments of the bearing 130 may not include an outer ring 135. In such an embodiment, the cages 164, 166 may engaged with the flex ring 134, for example.

Figure 4:
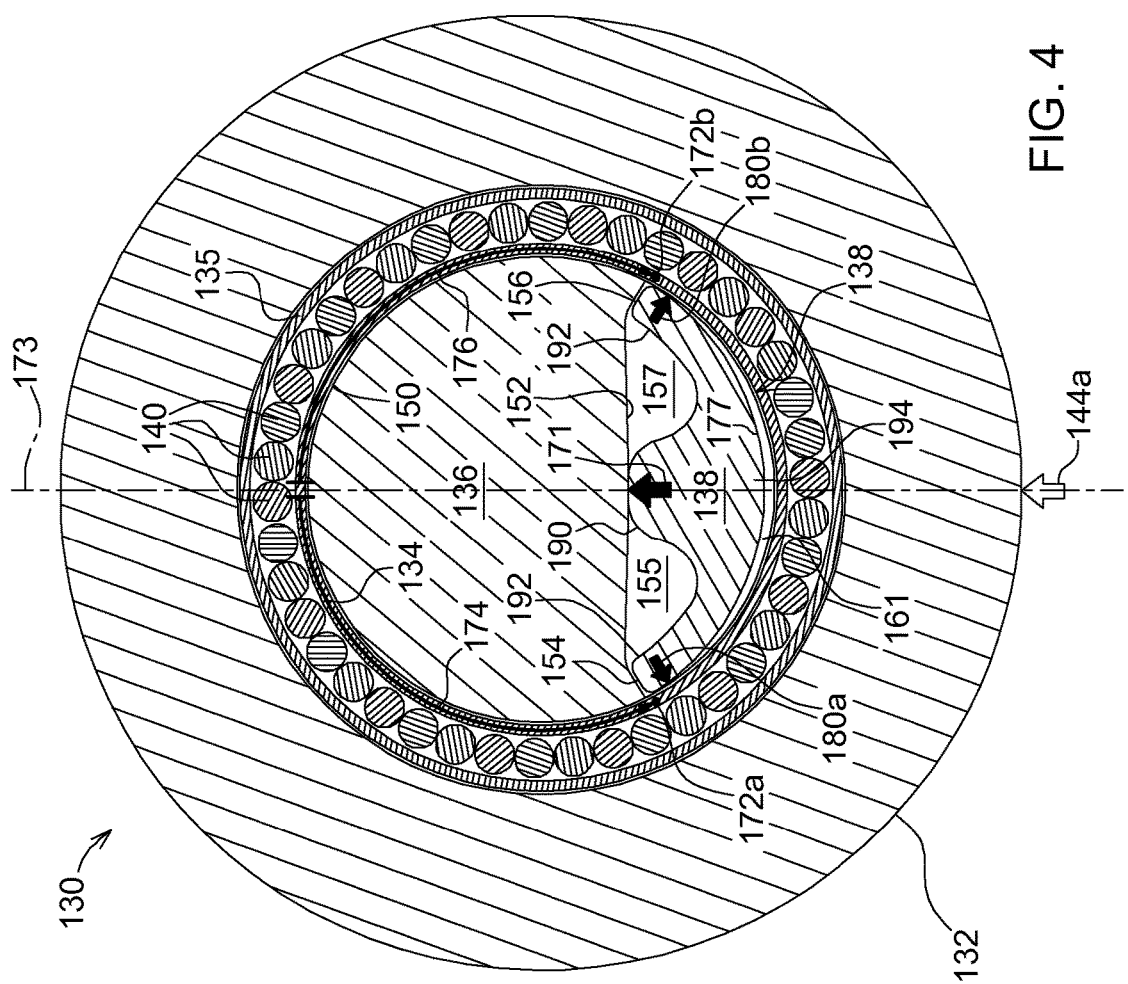
FIG. 4 is a sectional view of the distributed load bearing taken along lines 4-4 of FIG. 3, the bearing being in a first operating mode.
Figure 5:
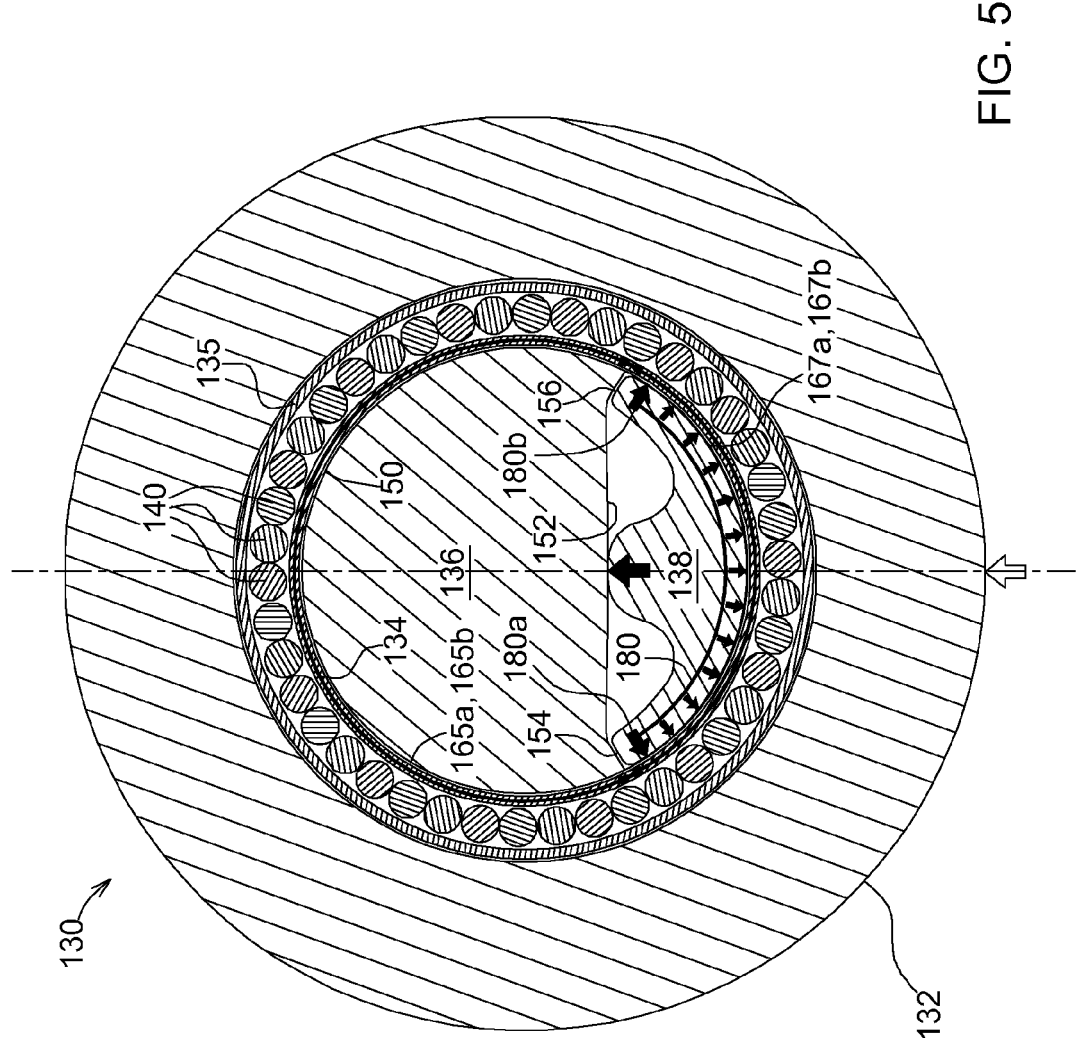
FIG. 5 is a sectional view of the distributed load bearing taken along lines 5-5 of FIG. 3, the bearing being in a second operating mode.

As shown specifically in FIGS. 4-5, the distribution spring 138 may include a hump 190, a pair of wings 192, and a coupling region 194. The hump 190 may be positioned, so as to apply the force 171 to the pin 136. The wings 192 may extend angularly and circumferentially outward from the hump 190 so as to apply the plurality of outward forces to the flex ring 134. The wings 192 overlap a portion of an inner diameter of the flex ring 134. The hump 190 and the first of the wings 192 and the pin 136 may cooperate, so as to define a first longitudinal gap 155 therebetween, and similarly the hump 190 and the second of the wings 192 and the pin 136 may cooperate so as to define a second longitudinal gap 157 therebetween.

The coupling region 194 may be positioned directly radially outward from the hump 190, and it may be angularly and circumferentially inward between the wings 192. The coupling region 194 may be displaced from the flex ring 134 during the first operating mode (see FIG. 4), but in contrast, the coupling region 194 may be in contact with the flex ring 134 during the second operating mode (see FIG. 5).

A first force 144a that is applied to the roller 132 during the first operating mode is lower than a second force 144b that is applied to the roller 132 during a second operating mode. The larger, second force 144b deflects the distribution spring 138, so as to close a gap 161 (see the transition between FIGS. 4-5). The difference in the magnitude between the first force 144a and the second force 144b may be based on combustion pressures within a respective cylinder, for example. The first and second forces 144a, 144b are example forces that are both illustrated as being normal to the roller 132. In actual operation, the first and second forces 144a, 144b may sweep about the roller 132 by some range of angles (e.g., +/−20°), in contrast to simply being normal thereto. In some operating modes and embodiments of the bearing 130, the gap 161 may be open, then closed, and then back open as the force applied to the roller 132 sweeps across it.

As shown in FIGS. 4-5, the pin 136 may include a partial outer circumferential surface 150, a planar surface 152, a first retainer 154, and a second retainer 156. The planar surface 152 may be positioned radially inward of the partial outer circumferential surface 150. The first retainer 154 may be positioned between and couple a first end of the partial outer circumferential surface 150 and a first end of the planar surface 152. And similarly, the second retainer 156 may be positioned between and couple a second end of the partial outer circumferential surface 150 and a second end of the planar surface 152. The first and second retainers 154, 156 may be positioned, so as to angularly retain the distribution spring 138.

An outer circumferential surface 165a of the pin 136 may overlap a first portion 165b of an inner circumferential surface of the flex ring 134, and an outer circumferential surface 167a of the distribution spring 138 may overlap a second portion 167b of the inner circumferential surface of the flex ring 134. A combination of the first portion 165b and the second portion 167b may overlap a substantial entirety of the inner circumferential surface of the flex ring 134.

Referring specifically to FIG. 4, there is shown a first operating mode, in which the flex ring 134 may be noncircular. In this mode, a first force 144a that is applied to the roller 132 is lower than it would be in a second operating mode (i.e., the second force 144b).

As already noted, the distribution spring 138 is preloaded, so as to apply a force 171 to the pin 136 and further to apply the outward forces to the flex ring 134. During the first operating mode, the radially outward forces cause the flex ring 134 to deflect asymmetrically and radially outward. This asymmetric deflection causes the rollers 140 to roll along the flex ring 134 and to travel along a noncircular path defined thereby. The flex ring 134 may be relatively thin, but very hard for handling the high contact forces applied by the rollers 140.

The flex ring 134 may be sometimes rotate angularly relative to the pin 136 and the flex ring 134, particularly during a load uptake mode (e.g., when the camshaft 110 rotates so as to contact the follower 115) or a load release mode (e.g., when the camshaft 110 rotates so as to no longer contact the follower 115). The rollers 140 may provide some friction torque in response the rotation of the flex ring 134. Allowing the flex ring 134 to rotate angularly may spread out the Hertzian contact peak pressure over the entirety thereof, rather than at a same location during every loading cycle. This angular freedom may be adjusted by changing, for example, the tolerances and finishes of the flex ring 134 and the pin 136.

The force 171 applied to the pin 136 may defines a force axis 173. The outward forces may include a first outward force 180a and a second outward force 180b (see FIG. 4). The first outward force 180a may be applied to the flex ring 134, on a side of the axis 173, at a first contact point 172a between the distribution spring 138 and the flex ring 134. And similarly the second outward force 180b may applied to the flex ring 134, but on an opposite side of the axis 173, at a second contact point 172b between the distribution spring 138 and the flex ring 134.

In some embodiments of the distribution spring 138, the hump 190 may act as a pivoter for allowing the distribution spring 138 to pivoter relative thereto, as forces 171, 180a, 180b vary relative to one another. The shape of the hump 190 and the length of the wings 192 may both be designed, so as to allow for such pivoting. The wings 192 may get progressively thicker when moving from the tips thereof towards the coupling region 194. Having the wings 192 be thicker closer to the coupling region 194 may aid in distributing the loads applied to the bearing 130 to more of the rollers 132 than would otherwise be the case.

In a first operating mode, the first contact point 172a may be angularly offset from the axis 173 by a first angular distance 174 about the flex ring 134, while the second contact point 172b may be angularly offset from the axis 173 by a second angular distance 178 about the flex ring 134 (see FIG. 4). The first and second angular distances 174, 178 may be equivalent in magnitude when the force 171 applied to the pin 136 is normal to a surface thereof.

The flex ring 134 may have a first asymmetrical deflection caused by the first outward force 180a, and the flex ring 134 may have a second asymmetrical deflection cause by the second outward force 180b. As this occurs, the distribution spring 138 and the flex ring 134 define a gap 161 therebetween, and the gap 161 extends circumferentially between the first and second contact points 172a, 172b. The actual size of the gap 161 may vary in size and may depend on a spring constant of the distribution spring 138, and may not be as relatively large or small as the illustrated gap 161 in FIG. 4. In some embodiments of the bearing 130, the gap 161 may be approximately 0.001".

Referring specifically to FIG. 5, there is shown a second operating mode, in which the flex ring 134 may be in the circular shape during a second operating mode. In the second operating mode, a second force 144b that is applied to the roller 132 is higher than the first force 144a, meaning that the bearing 130 is more heavily loaded.

When in the second operating mode, an outer circumferential surface 177 of the distribution spring 138 and an inner circumferential surface of the flex ring 134 are entirely in contact between the first and second contact points 172a, 172b. This form of contact may fan angularly, so as to define a continuous contact 172 that extends between, and includes, the first and second contact points 172a, 172b Further, in the second operating mode, the plurality of radially outward forces may fan angularly, so as to define a continuous outward force 180 that extends between, and includes, the first and second outward forces 180a, 180b (see FIG. 5).

When oscillating between the first and second operating modes—as shown in FIGS. 4-5, respectively—the flex ring 134 may cyclically deflect relative to the roller 132, both radially inwards and outwards.

Figure 3:
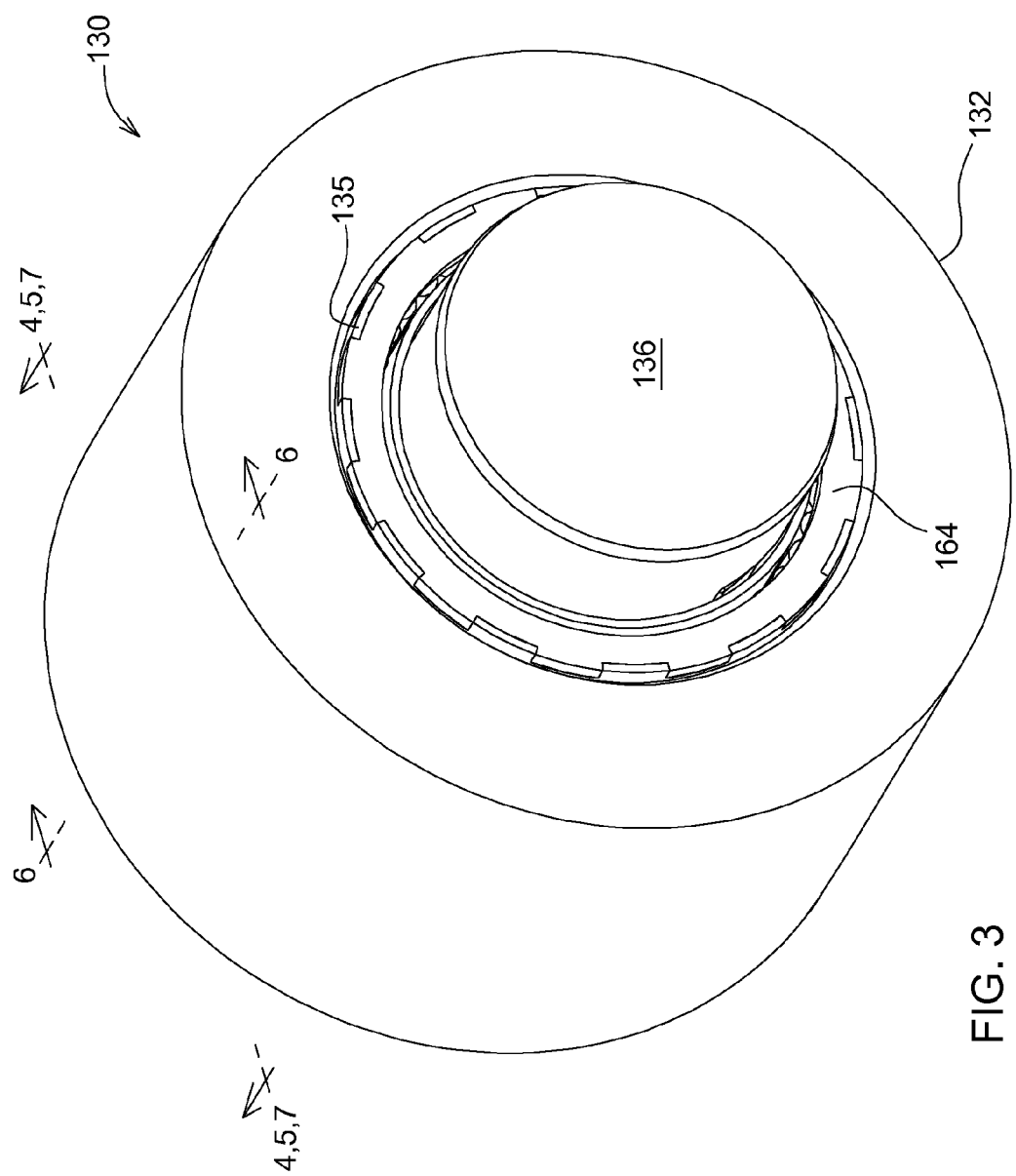
FIG. 3 is an enlarged perspective view of an example of a distributed load bearing.

Shown in FIG. 6 is a sectional view of the bearing 130 taken along lines 6-6 of FIG. 3. As shown in FIG. 6, the pin 136 may include a main body 195 with a first retaining cap 196 on one end thereof, and a second retaining cap 198 on the other end thereof. The main body 195, the first cap 196, and the second cap 198 may define a portion of the cavity 139 that the distribution spring 138 is positioned in.

Whether in the first or second operating mode, the distribution spring 138 and the flex ring 134 cooperate so as to load a larger set of rollers 140 than would be possible without the distribution spring 138 and the flex ring 134. Additionally, in the second operating mode, all of the rollers 140 positioned between the first and second contact points 172a, 172b (i.e., under the distribution spring 138) may be loaded, in contrast to just two or three of them. The flex ring 134 is loaded, such that it is deflected to load the rollers 140 further from the axis 173 first. Distributing the load across a larger set of the rollers 140 may place the bearing 130 into a heavier load range capability and/or expand its life. Still further, it may lower friction power losses; lower starting torques, which prevents scuffing and wear during start-up; and lower the volume and quality of the lubricant that is required, as compared to some other bearings.

Figure 7:
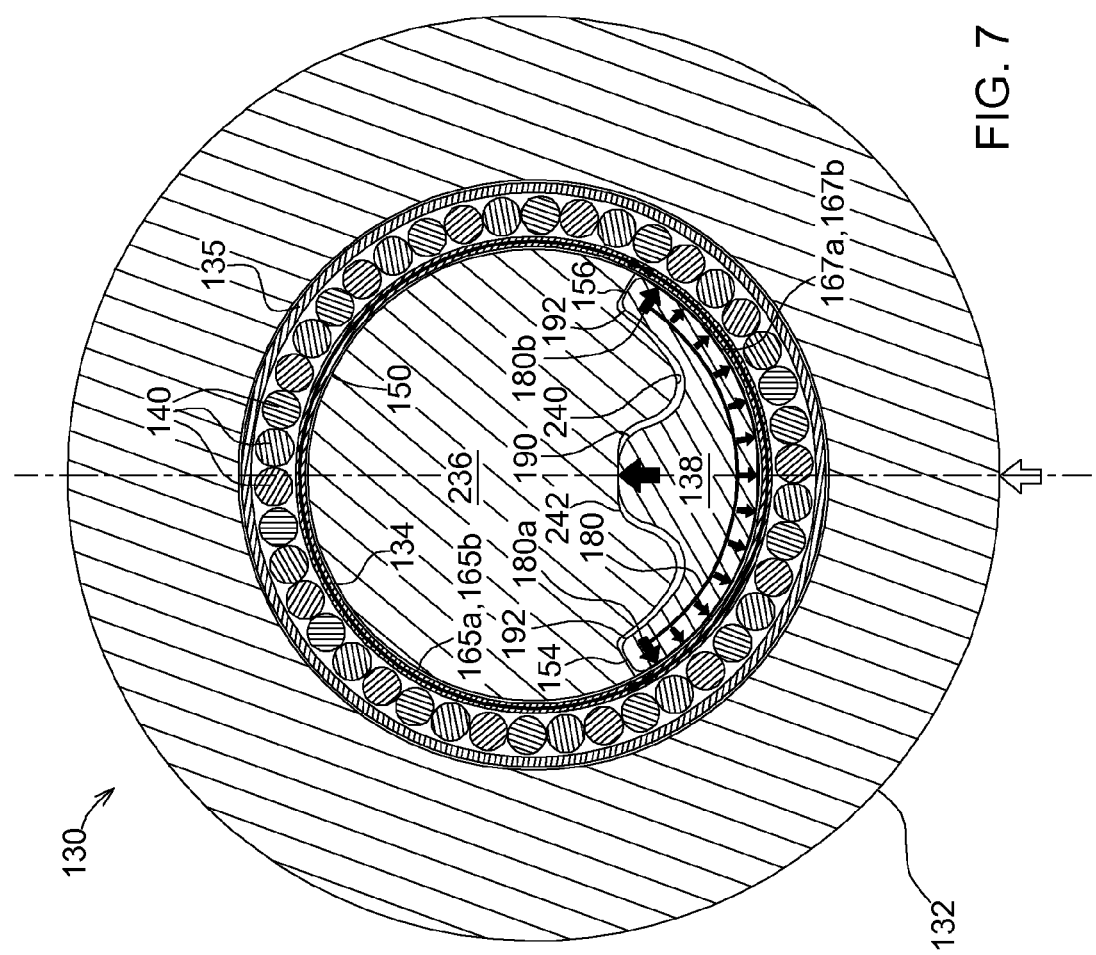
FIG. 7 is a sectional view of the distributed load bearing taken along lines 7-7 of FIG. 3, illustrating a second embodiment of a pin.

Referring to FIG. 7, there is shown a second embodiment of a pin 236. This embodiment of the pin 236 may include a partial outer circumferential surface 150, a surface 240, a first retainer 154, and a second retainer 156. The surface 240 may follow a contour that is substantially similar to the contour of the hump 190 and the wings 192. And in particular, the surface 240 may include a hump receiving surface 242 that follows the contour of the hump 190. The hump receiving surface 242 and the hump 190 may provide a larger contact area with increased loads. Further, deflection of the distribution spring 138 will increase as loads increase, and this deflection will increase its radius of curvature. Together—the larger contact area and the increased radius of curvature—may improve load distribution in the contact area and increase entrainment of oil into the contact area (i.e., the contact area increases so quickly that oil cannot escape and is trapped in the contact area).

The first retainer 154 may be positioned between and couple a first end of the partial outer circumferential surface 150 and a first end of the surface 240. And similarly, the second retainer 156 may be positioned between and couple a second end of the partial outer circumferential surface 150 and a second end of the surface 240. The first and second retainers 154, 156 may be positioned, so as to angularly retain the distribution spring 138.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A distributed load bearing, comprising:
an outer roller;
an inner flex ring positioned radially inwards of the outer roller;
a pin positioned radially inwards of the inner flex ring; and
a load distribution spring being positioned in a cavity defined by the pin and the inner flex ring, and the load distribution spring being preloaded so as to apply a force to the pin and so as to apply a plurality of radially outward forces to the inner flex ring.

2. The distributed load bearing of claim 1, wherein the radially outward forces cause the inner flex ring to deflect asymmetrically and radially outward.

3. The distributed load bearing of claim 1, wherein the pin and the load distribution spring are angularly and axially fixed.

4. The distributed load bearing of claim 1, further comprising a plurality of rollers positioned radially inwards of the outer roller and radially outwards of the inner flex ring, the inner flex ring is noncircular, and the plurality of rollers roll along a noncircular path about the inner flex ring.

5. The distributed load bearing of claim 1, wherein the inner flex ring deflects asymmetrically and radially inwards and outwards relative to the outer roller.

6. The distributed load bearing of claim 1, wherein:
the inner flex ring deflects asymmetrically and radially outward relative to a circular shape during a first operating mode; and
the inner flex ring is in the circular shape during a second operating mode, and a first force that is applied to the outer roller during the first operating mode is lower than a second force that is applied to the outer roller during the second operating mode.

7. The distributed load bearing of claim 1, wherein the pin comprises:
a partial outer circumferential surface;
a planar surface being positioned radially inward of the partial outer circumferential surface;
a first retainer positioned between and coupling a first end of the partial outer circumferential surface and a first end of the planar surface; and
a second retainer positioned between and coupling a second end of the partial outer circumferential surface and a second end of the planar surface, the first retainer and the second retainer being positioned so as to angularly retain the load distribution spring.

8. A valvetrain follower for an engine, the valvetrain follower comprising the distributed load bearing of claim 1.

9. The distributed load bearing of claim 1, wherein when in a first operating mode, the force applied to the pin defines a force axis, the plurality of radially outward forces comprises a first radially outward force and a second radially outward force, the first radially outward force is applied to the inner flex ring on a side of the force axis at a first contact point between the load distribution spring and the inner flex ring, and the second radially outward force is applied to the inner flex ring on an opposite side of the force axis at a second contact point between the load distribution spring and the inner flex ring.

10. The distributed load bearing of claim 9, the first contact point is angularly offset from the force axis by a first angular distance about the inner flex ring, the second contact point is angularly offset from the force axis by a second angular distance about the inner flex ring, and the first angular distance and the second angular distance are equivalent in magnitude when the force applied to the pin is perpendicular to a surface thereof.

11. The distributed load bearing of claim 9, wherein the inner flex ring has a first asymmetrical deflection caused by the first radially outward force, and the inner flex ring has a second asymmetrical deflection cause by the second radially outward force.

12. The distributed load bearing of claim 9, wherein when operating in the first operating mode, the load distribution spring and the inner flex ring define a gap therebetween, and the gap extends circumferentially between the first contact point and the second contact point.

13. The distributed load bearing of claim 9, wherein when operating in a second operating mode, an outer circumferential surface of the load distribution spring and an inner circumferential surface of the inner flex ring are entirely in contact between the first contact point and the second contact point.

14. The distributed load bearing of claim 1, wherein the load distribution spring comprises:
a hump positioned so as to apply the force to the pin; and
a pair of wings extending angularly and circumferentially outward from the hump so as to apply the plurality of radially outward forces to the inner flex ring, and the pair of wings overlap a portion of an inner circumferential surface of the inner flex ring.

15. The distributed load bearing of claim 14, wherein the load distribution spring comprises a coupling region, the coupling region is positioned directly radially outward from the hump, and the coupling region is angularly and circumferentially inward between the pair of wings.

16. The distributed load bearing of claim 14, wherein the coupling region is displaced from the inner flex ring during a first operating mode, the coupling region is in contact with the inner flex ring during a second operating mode, and a force that is applied to the outer roller during the first operating mode is lower than a force that is applied to the outer roller during the second operating mode.

17. The distributed load bearing of claim 1, wherein an outer circumferential surface of the pin overlaps a first portion of an inner circumferential surface of the inner flex ring, and an outer circumferential surface of the load distribution spring overlaps a second portion of the inner circumferential surface of the inner flex ring.

18. The distributed load bearing of claim 17, wherein the first portion and the second portion overlap an entirety of the inner circumferential surface of the inner flex ring.

* * * * *